UNITED STATES PATENT OFFICE.

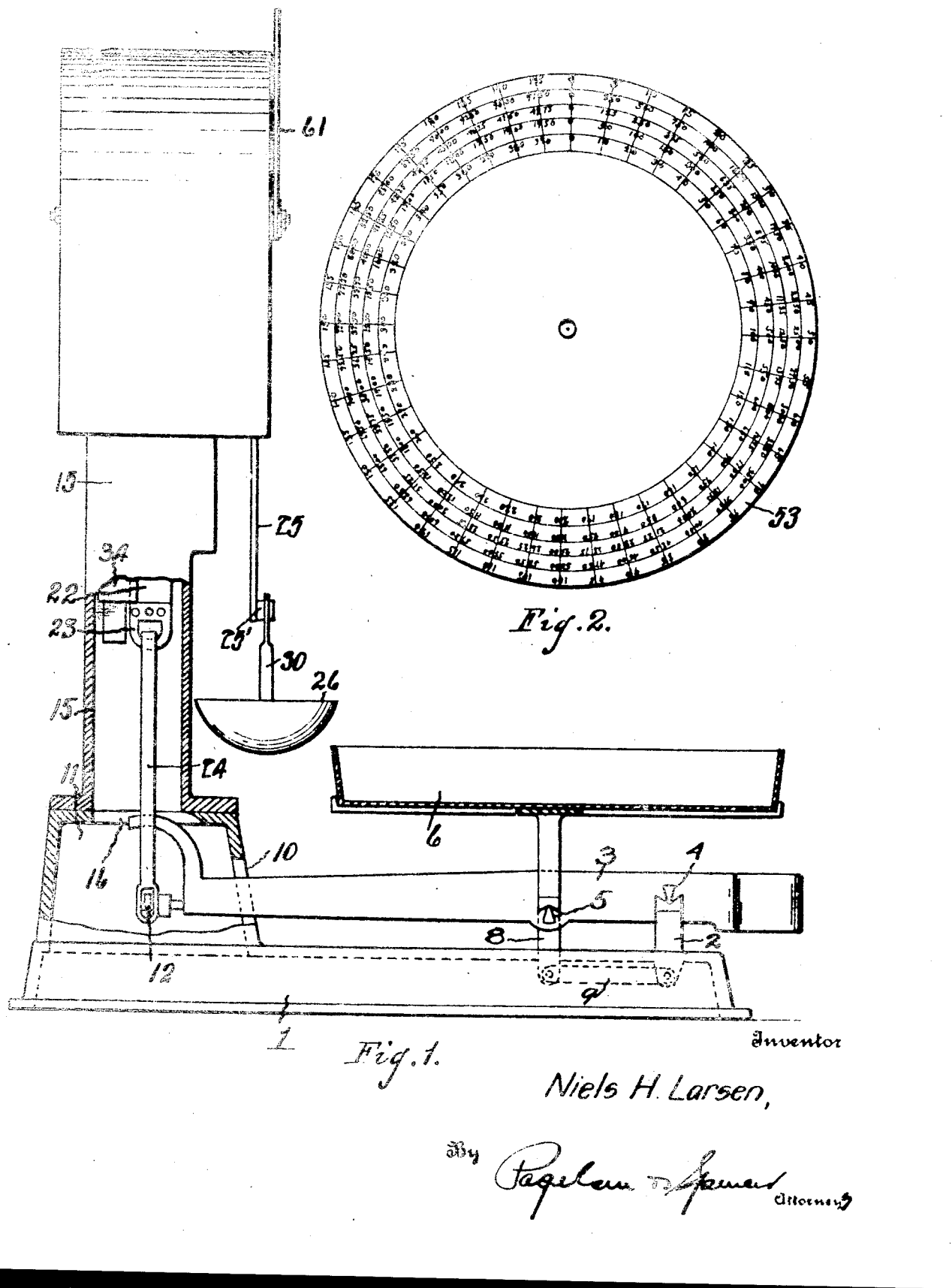

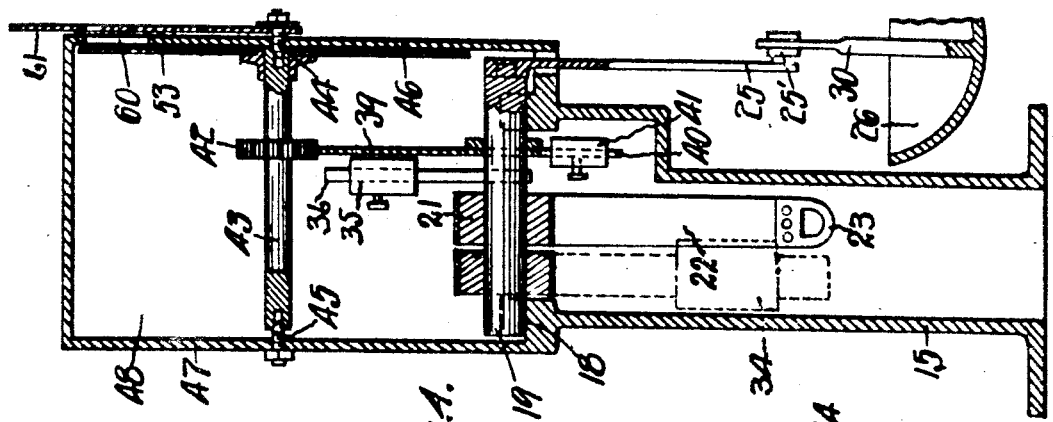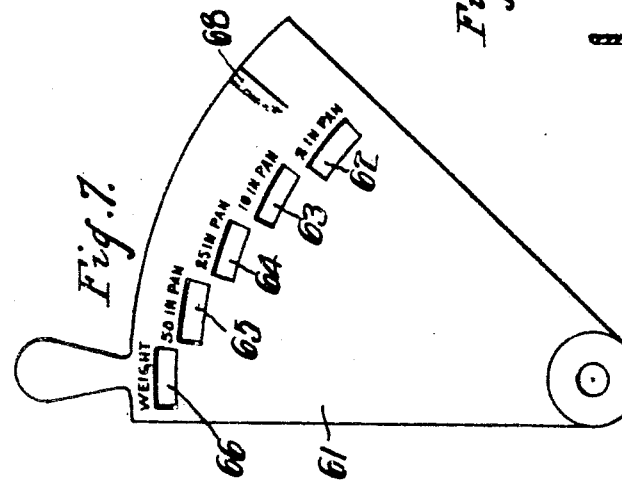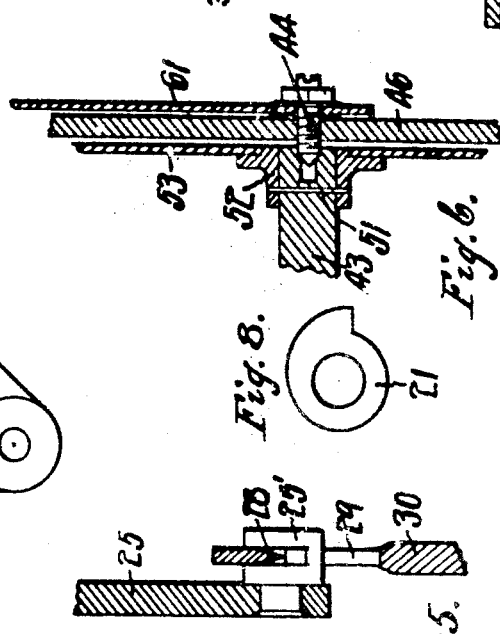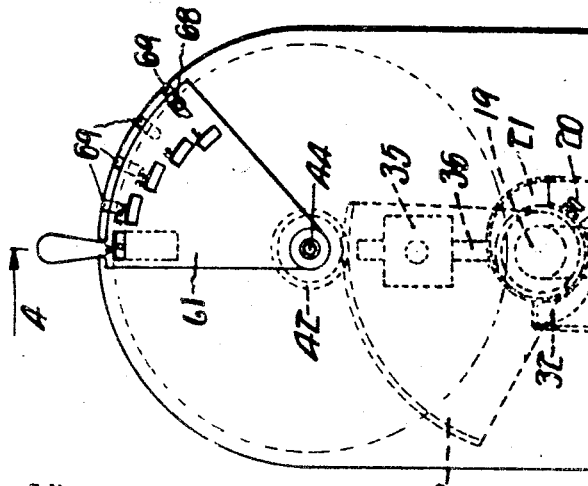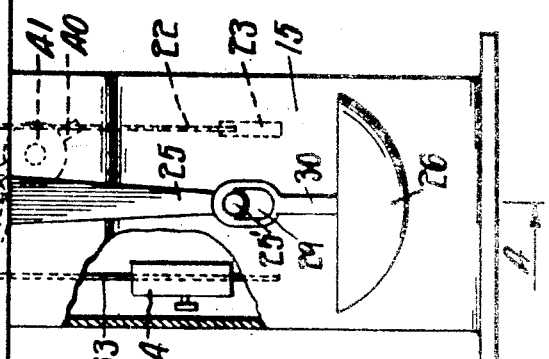

NIELS H. LARSEN, OF DETROIT, MICHIGAN.

COUNTING-SCALE.

1,301,460.   Specification of Letters Patent.   Patented Apr. 22, 1919.

Application filed August 15, 1918. Serial No. 249,935.

*To all whom it may concern:*

Be it known that I, NIELS H. LARSEN, a subject of the King of Denmark, and residing at Detroit, in the county of Wayne and State of Michigan, have invented a new and Improved Counting-Scale, of which the following is a specification.

The object of the present invention is to provide a more simple, reliable and less expensive scale whereby commodities may be weighed and whereby articles of a uniform nature may be counted than has been available heretofore.

One feature of the invention resides in a shaft having thereon a counterweighted arm from which a pan or other load receiver is pivotedly suspended or supported, the arm being arranged to normally hang vertically below the shaft when a load is placed in the pan.

Again, the invention consists in a shaft and arm of the type referred to with which is associated a second or main load receiver adapted to rise and fall substantially in a vertical line, and means connecting the second receiver and shaft so constructed and arranged that the angular deflection of the arm varies in proportion to the weight of the load on the second receiver.

The invention further consists in a revoluble dial having concentric sets of figures each corresponding to a factor number of articles in the first load receiver, together with a selector or screen whereby all but that set which corresponds to the particular factor number used is concealed.

The invention further consists in various other details of construction shown, described and pointed out in the claims.

In the drawings, Figure 1 is a side view, parts being broken away, showing a preferred embodiment of the invention. Fig. 2 is an enlarged front view of one form of dial therefor. Fig. 3 is a front view of the pedestal and associated parts which appear in Fig. 1. Fig. 4 is a section on line 4—4 of Fig. 3, the position of one of the counterweights being indicated in dashed lines. Fig. 5 is an enlarged fragmentary vertical section showing a preferred form of pan-supporting pivot. Fig. 6 is a similar section showing the front support for the dial shaft. Fig. 7 is an enlarged front elevation of the scale selector for the dial. Fig. 8 is a front elevation of one of the cams for the main shaft.

1 indicates any suitable form of base having the posts 2 on which the main lever or beam 3 is supported by pivots 4, the beam itself carrying pivots 5 whereon the platform 6 rests, said platform having a downwardly extending arm 8 that passes through a slot, not shown, in the base and is steadied by means of the pivoted link 9. The beam 3 projects through a slot 10 into the chamber 11 formed in the base, and has its end provided with any suitable knife edges or pivots 12. The parts thus far described are well-known and the particular construction of these parts, or their equivalent, may be varied within wide limits; in other words, the invention may be applied to substantially any desired form of lever and platform mechanism.

Rising from the base is a pedestal 15 that surrounds the opening 16 in the top of the chamber 11; as shown, the upper end of the pedestal has bearings 18 for the shaft 19, and fixed on the latter within the pedestal, as by means of screw 20, is a cam 21 over which passes a metal or other suitable flexible band 22 which may be secured thereto by said screw or otherwise. This band is provided at its lower end with a connector 23 in which the pull rod 24, Fig. 1, is hooked, said rod receiving the knife edges or pivots 12 at its lower end. The front end of the shaft 19 projects from the pedestal and has fixed thereto an arm 25 the outer end of which carries a pivot block 25' whereon a pan 26 is hung by means of the knife edge 28. In the embodiment shown, this knife edge is formed on the upper end wall of a slot 29 in the hanger 30 for the pan, but various other suitable pivoted connections may be used. The weight of the cam 21 and band 22, together with the main beams and associated parts, in so far as it may tend to turn the shaft 19 clockwise, Fig. 3, is accurately counterbalanced by the cam 32 (which is a counterpart of the cam 21 in shape but is reversely arranged), the band 33, and the weight 34; and the weight of the arm 25 and pan 26 is likewise counterbalanced by means of the weight 35 which is preferably mounted on an arm 36 pressed or riveted into the shaft 19.

Fixed on the shaft is a thin gear segment 39 having an arm 40 on which a counterpoise 41 is carried. This segment meshes with the pinion 42 fixed on the dial shaft 43 which is supported in any convenient way, say by the centers 44 and 45. In the present embodiment of the invention, the pedestal has formed integrally therewith heads 46—47 for the dial chamber 48, and the centers 44—45 are threaded therein for adjustment as will be readily understood. Secured to the front end of the shaft, as by means of the pin 51 and collar 52, Fig. 6, is a circular dial 53, preferably of light metal.

In the embodiment shown, the dial is uniformly graduated and carries five concentric rows of figures, the outer of which may indicate weight, whereas the rest indicate numbers in accordance with a corresponding factor number of articles which may be placed in the pan 26. Thus, the inner set of figures on the dial shown corresponds to a factor 2, and the second, third and fourth sets correspond to the factors 10, 25 and 50, respectively, while the outer set represents the weight. That is, if two bolts or other uniform articles are placed on the pan 26 and an unknown number of like articles are placed on the receiver 6, the correct number of the latter may be derived from the figures of the inner set, as hereinafter explained, and if a unit of weight is placed on the pan, the correct weight of the articles can be obtained from the outer set.

The figures of the several sets are visible through the slot 60 in the end 46, but for the purpose of concealing all but one set of figures at a given time, a selector 61 is provided, this selector being mounted to swing on the center 44 and having a series of slots 62—63—64—65 and 66 spaced radially and circumferentially from each other. A tongue 68 struck from the selector is arranged to engage any one of a series of notches 69 in the front face of the end 46 thereby holding the selector in proper adjusted position with reference to the slot 60.

It will be observed that the platform 6 travels in a substantially vertical line, whereas the pivot 25' for the pan 26 travels in a wide arc, its maximum angular movement preferably being 90 degrees. Were the cam 21 replaced by a cylinder concentric with the shaft, it is evident that a given addition of load on the band 22 would cause a less deflection at a later point in the angular movement of the arm 25 than at an earlier point, and that the dial could not, therefore, be uniformly graduated. In order to prevent this and thereby render the angular movement of the arm 25 directly in proportion to the load on the platform 6, the cam is constructed as shown, that is, with a maximum radius at the initial point of contact with the band and with a diminishing radius thereafter, the change being as the variation of the sine of the angle of deflection of the arm. In this manner, the product of the constant weight of the articles applied through the band 22 multiplied by the varying arm of the cam surface is always equal to the sine of the angular deflection of the arm 25 (which deflection varies in exact proportion to the weight on the platform 6) times the weight on the pan 26.

Should it be desired to obtain the actual weight of the articles, a unit of weight is put in the pan, the selector is turned to the position shown, and the corresponding figure of the outer set is read through the slot 66. If the number of articles is desired and the quantity is large, 50 like articles are put in the pan, the selector is turned to the left, Fig. 1, one notch, whereupon the proper figure becomes visible through the slot 65. Conversely, if it is desired to measure out say 150 articles, the slot 62 may be brought into registration with the slot 60 and two articles put in the pan 26, after which others are heaped on the platform 6 until the figure 150 appears.

The construction described is simple, inexpensive, not likely to get out of order, and may be operated with a minimum of setting or adjusting of parts; however, I am aware that various changes may be made without departing from the spirit of the invention.

I claim:—

1. A scale comprising a movable dial having thereon a plurality of sets of figures arranged in rows, a member having a slot through which the several sets are visible, and a selector having relative movement in respect to said slot and lengthwise of the rows of figures, said selector being formed to screen the figures in such manner as to expose the figures of one set only at a given time, the particular set so visible depending on the position of the selector.

2. A scale comprising a movable dial having thereon a plurality of sets of figures arranged in rows, two members one of which is movable in respect to the other lengthwise of said rows, said members having openings adapted to register with one another in front of said rows of figures in such manner as to expose to view the figures of one set only at a given time, the particular set thus exposed depending on the relative position of the members.

3. A scale comprising a shaft having an arm rigid therewith, a receiver pivotally supported on the end of said arm, the arm and receiver being counterbalanced about the shaft and normally hanging with the pivotal connection between the arm and receiver in the same vertical plane with the axis of the shaft when an article or unit of weight is placed on the receiver, a second load receiver, and a connection between said second receiver and the shaft whereby loads or weights on the second receiver cause the arm to swing about its axis, means for counterbalancing the connection and second load receiver with reference to their tendency to swing the shaft about its axis, and means for indicating the relation between the loads on the two receivers.

4. A scale comprising an arm pivoted to swing about a fixed axis, a pan pivotally supported on said arm, said arm being free to swing into a vertical position, means for counterbalancing the arm and pan about said axis, said pan being adapted to receive articles or weights and normally hanging vertical from the pivot when supplied with said articles or weights, a load receiver and a connection between said receiver and arm whereby loads placed thereon tend to swing the arm about its axis, means for counterbalancing the receiver and connection about said axis, and means actuated by the arm for showing the number of weights or articles in the receiver when one or more similar weights or articles are placed on the pan.

5. A scale comprising a rotatable shaft having an arm, a receiver pivotally supported on said arm, a band connected to the shaft and tending to turn it in one direction, means for counterbalancing the shaft in respect to the arm and the normal pull of the band, a gear rotatable with the shaft, a fractional pinion meshing with the gear, means for counterbalancing the pinion, a second shaft for the pinion, and a rotatable dial controlled by said second shaft, whereby the relation of a load on the receiver to an abnormal stress on the band is indicated.

6. A scale comprising a rotatable shaft and a dial carried thereby, said dial having thereon a plurality of sets of figures concentric about the axis of the shaft, a member having a slot through which the several sets of figures are visible, and a selector swingable about the axis of the shaft and having a series of slots of less radial depth than the first named slot and spaced radially and circumferentially from each other about the axis of the shaft, any one of said last mentioned slots being adapted to register with the first named slot when the selector is properly adjusted about said axis, whereby the figures of the corresponding set may be observed.

7. A scale comprising a platform which is movable as a whole approximately straight up and down, a rotatable shaft, a band actuated by the platform, cam means fixed to the shaft and forming two like cam surfaces reversely arranged about the shaft, the band passing over one of the cam surfaces, a second band passing over the other cam surface, and a counterweight attached to the second band whereby the pull of the platform and first band on the shaft is counterbalanced, and means actuated by the shaft for indicating the weight of a load on the platform.

8. A scale comprising a platform which is movable as a whole approximately straight up and down, a rotatable shaft, a band actuated by the platform, cam means fixed to the shaft and forming two like cam surfaces reversely arranged about the shaft, the band passing over one of the cam surfaces, a second band passing over the other cam surface, and a counterweight attached to the second band whereby the pull of the platform and first band on the shaft is counterbalanced, an arm fixed to the shaft, a load receiver pivotally suspended on the arm, means for counterbalancing the arm and load receiver about the shaft, and means actuated by the shaft for indicating the relation of a load on the platform to a load on the receiver.

9. A scale comprising a rotatable dial having a plurality of concentric rows of figures thereon, an apertured screen through which said figures may be observed, and a selector swingable about the axis of the dial and arranged to coöperate with said screen to uncover the figures of different sets as different portions of the selector are moved into registration with a given fixed radial plane through said axis.

NIELS H. LARSEN.